Figure 2:
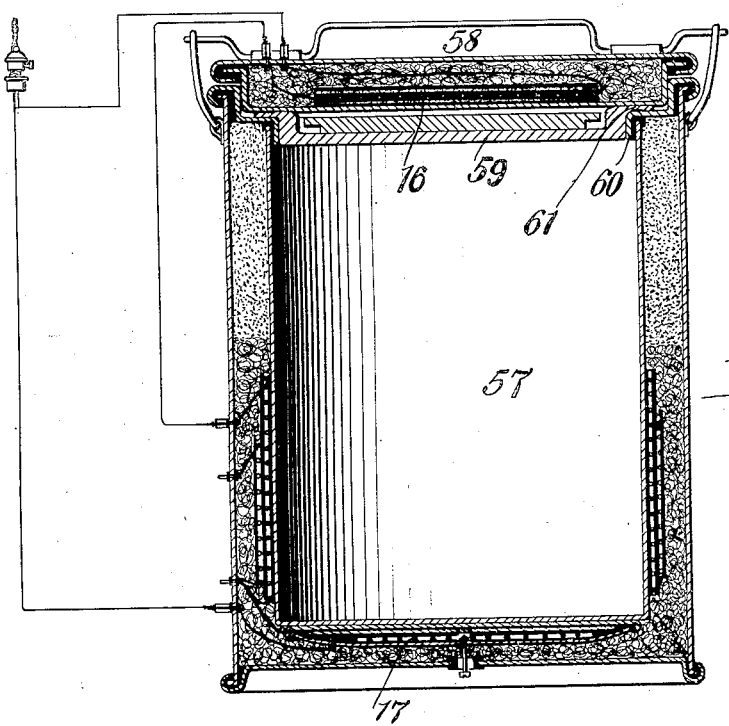

F. C. PERKINS.
ELECTRIC COOKER.
APPLICATION FILED OCT. 10, 1911.
1,056,933.
Patented Mar. 25, 1913.
2 SHEETS—SHEET 1.
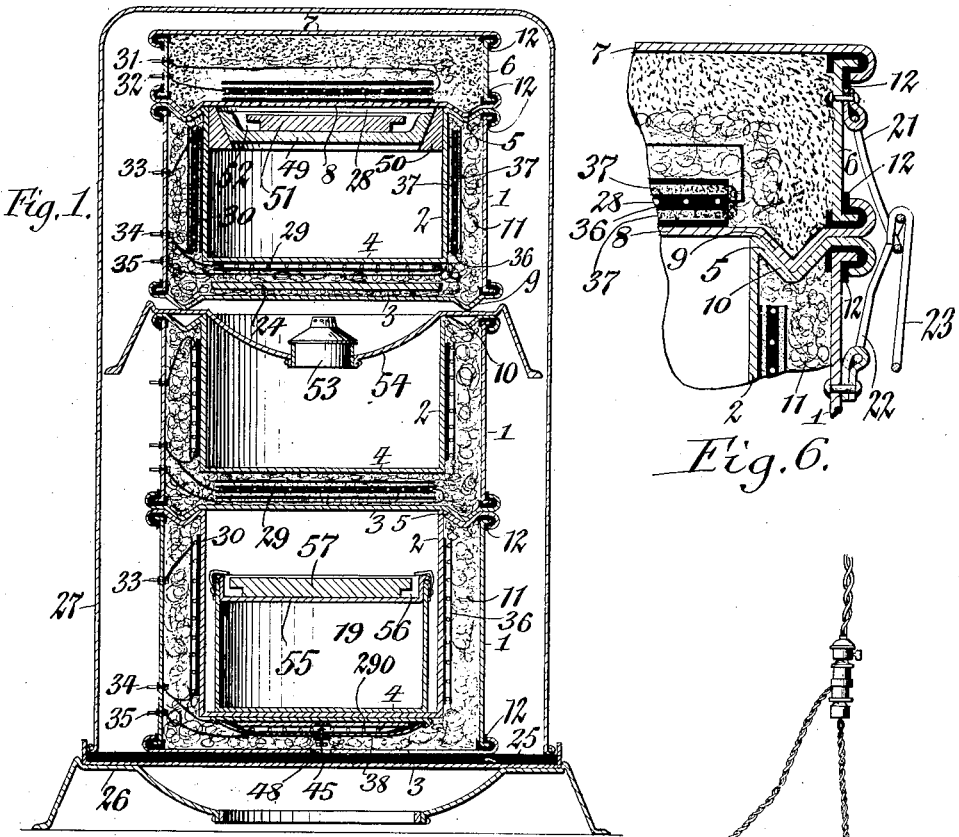
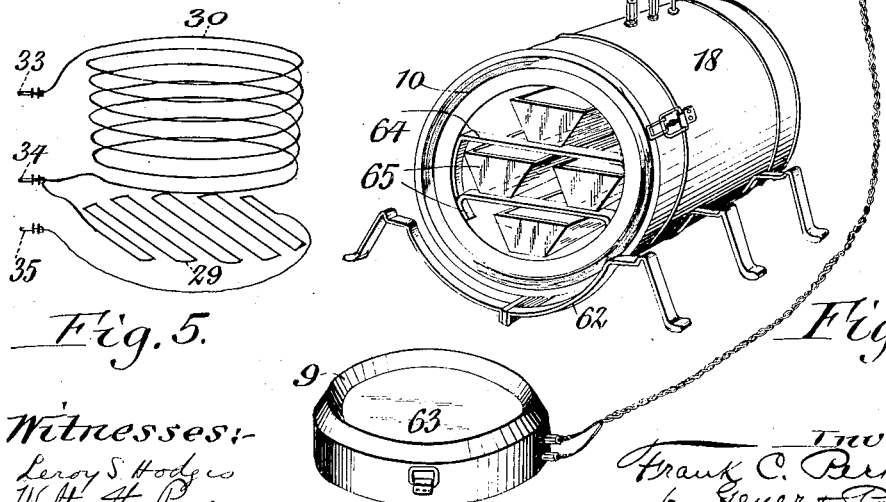
Witnesses:
Leroy S. Hodges
Walter H. Popp
Inventor
Frank C. Perkins
by Geyer & Popp
Attorneys

F. C. PERKINS.
ELECTRIC COOKER.
APPLICATION FILED OCT. 10, 1911.

1,056,933.

Patented Mar. 25, 1913.
2 SHEETS—SHEET 2.

Witnesses:—
Leroy S. Hodges
Walter H. Popp

Inventor
Frank C. Perkins
by Leeper & Robb
Attorneys.

UNITED STATES PATENT OFFICE.

FRANK C. PERKINS, OF BUFFALO, NEW YORK.

ELECTRIC COOKER.

1,056,933.  Specification of Letters Patent.  Patented Mar. 25, 1913.

Application filed October 10, 1911. Serial No. 653,846.

*To all whom it may concern:*

Be it known that I, FRANK C. PERKINS, a citizen of the United States, residing at Buffalo, in the county of Erie and State of New York, have invented new and useful Improvements in Electric Cookers, of which the following is a specification.

This invention has for its object the production of a high grade as well as simple, cheap and efficient means of heat insulating the inner lining from the outer wall of a metal electric cooker, to prevent the loss by conduction through the joints, which has heretofore been the greatest loss of heat, in metal cookers, the radiation through a section from the inner lining to the outer shell having been small with ordinary means of insulation as compared to the great escape from lining and bottom through metal contact joints to the inner shell; also the efficient, cheap and simple application of electric heating to such cookers, whereby food may be cooked or material heated to temperatures up to 300 or 400 degrees Fahrenheit or thereabout with comparatively small loss in heat.

It is well known that most cookers utilize hot plates of iron or soap stone which are heated by gas, coal or oil flame and placed within the cooking chamber, the utensils with or without a heated body of water being in the same chamber as said hot plates. The large amount of heat absorbed by the water and hot plate is slowly given up to the food to be cooked, when the whole is inclosed in a chamber well insulated with asbestos, mineral wool or regranulated cork to prevent the heat from escaping to the outside of the cooker.

My invention provides for the placing of the hot plates of iron, composition or soap stone permanently in the base, side walls or cover, or any or all of same or of one or more sections of a built up sectional cooker, each hot plate section being heated over a gas or other burner on a stove or by means of alcohol lamps supported by a wire frame under a single cooker section or under several sections which are stacked together, the necessary air for supporting combustion passing between the sections which are held apart by the wire frames or guards.

In the ordinary cooker, the heat is all first absorbed by the water or hot plates heated by a flame and then given off to the food during the night or other time of day while in my invention electric heat is applied to the side walls and bottom of a cooker or section of same which allows the heat to be applied quickly and retained by hot plates, or the electric heat may be applied slowly without hot plates and only a small amount of heat electrically used continuously for a considerable length of time or throughout the night, so that the food is hot and ready for service in the morning. With the ordinary cooker not only must outside heat be applied to boil the water in the first place but the food, while thoroughly cooked, must still be reheated a trifle before serving. In this application of electric heat all hot plates may be done away with if desired, because the wall or base wiring for producing the electric heat is at roasting or high temperature so as to effect quick cooking, baking or browning of roast meats. One of these windings only is utilized for producing a high temperature of short duration while for long continuous heat at very low temperature both side and base windings are placed in series.

If thermostatic electric control is desired in the base of the cooker a combined electric heater, condenser and thermostat may be employed holding the temperature at any point desired by the adjustment of a screw or equivalent device at the center of the base.

Figure 4:
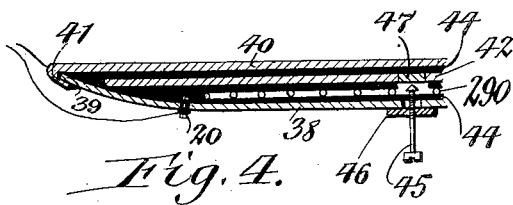
Figure 7:
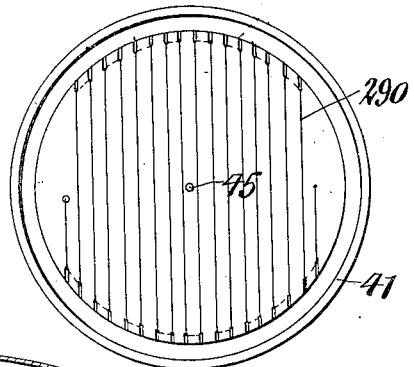
Figure 8:
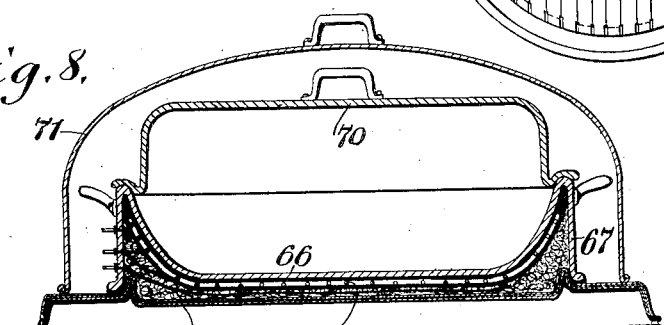

In the accompanying drawings consisting of 2 sheets:—Figure 1 is a vertical section of a cooker embodying my improvements in the most elaborate form. Fig. 2 is a similar view showing a cooker of simpler form containing my improvements. Fig. 3 is a perspective view showing my invention embodied in an electric baking oven or roaster. Fig. 4 is a diagrammatic view of the wiring of the thermostatic electric heater and condenser forming part of my invention. Fig. 6 is a fragmentary vertical section, on an enlarged scale, showing one of the means for detachably connecting two adjacent sections of a sectional fireless cooker. Fig. 7 is a diagrammatic plan view of the preferred manner of arranging the wiring of the thermostatic electric heater and condenser shown in Fig. 4. Fig. 8 is a vertical section showing my invention applied to a roaster constructed in the manner of enameled ware.

Similar characters of reference indicate corresponding parts throughout the several views.

The construction of cooker shown in Figs. 1 and 2 comprises a plurality of superposed cooking vessels and a cover, the several vessels being stacked so that the bottom of each upper vessel forms a cover for the opening at the top of the next lower vessel and the cover closing the opening at the upper end of the uppermost vessel.

Each of the vessels preferably comprises a cylindrical upright outer wall 1, a cylindrical upright inner wall 2 having its upper edge flush with the upper edge of the outer wall while its lower edge stops short of the lower edge of the outer wall, a horizontal outer bottom 3 connected with the lower edge of the outer wall, a horizontal inner bottom 4 connected with the lower edge of the inner wall, and a ring 5 connecting the upper edges of the outer and inner walls, said walls, bottoms and ring being constructed of earthenware, enamelware, asbestos board or sheet metal, such as aluminum or galvanized iron.

The cover preferably comprises an upright cylindrical outer wall 6, a horizontal top 7 connected with the upper edge of the outer wall, and a horizontal bottom 8 connected with the lower edge of the outer wall, said wall and top being constructed of earthenware, asbestos board or sheet metal, such as aluminum or galvanized iron and the bottom of sheet metal such as aluminum.

The bottom and outer wall of each vessel and the top and outer wall of the cover constitute the jackets or shells of these body members, and the bottom of the cover and the inner wall and bottom of each vessel constitute the linings of these body members.

The several vessels and the cover are preferably interlocked by means of an annular tongue, bead or rib 9 formed on the underside of the bottom of each of these members except the lowermost adjacent to the periphery thereof and engaging with an annular groove 10 in the ring of the member next below the same, thereby producing a practically air tight joint between the several members for confining the heat within the vessels. The space within each of the vessels and the cover constituting the body members of the cooker is packed or loaded with a filling 11 of heat insulating material such as asbestos, mineral wool or regranulated cork.

For the purpose of reducing the loss of heat by conduction from the inner walls and bottoms of the vessels and the bottom of the cover to the outer walls of these members when the latter are of sheet metal, insulating means are provided which preferably comprise a strip 12 of asbestos secured by silicate of soda, asbestos-cement or other adhesive between the interlocking marginal flanges of the outer wall and the top ring of each vessel, also between the marginal interlocking flanges on the outer wall and bottom of each vessel, also between the interlocking marginal flanges of the outer wall and bottom of the cover, and also between the marginal interlocking flanges of the outer wall and top of the cover.

The several body members of the cooker may be detachably connected by any suitable means, for instance by the means which are shown in the drawings and which consist of two loops 21, 22 pivoted on adjacent body members and a clamping lever 23 pivoted on one of the loops and engaging with the other loop, as shown in Fig. 6.

For the purpose of avoiding the necessity of handling hot plates as is the case when the same are made separate from the body of the cooker and placed within the latter after being heated, such plates may be permanently built in the space between the outer jacket and the inner shell of one or more of the body members, as shown for instance in Fig. 1, in which a hot plate 24 is embedded in the insulating filling between the inner and outer bottoms of the uppermost vessel. By means of this construction a saving of room within the cooking space of the cooker is effected and also separate handling of the hot plates is avoided, it being only necessary to place the cooker section containing the hot plate over a burner or on a stove and after the plate in each section is sufficiently hot the food to be cooked is inclosed within the cooking space either with or without the utensils or dishes for containing the same.

In order to still further conserve or retain the heat within the compartments of the cooker so as to utilize the same with the better effect in cooking the food the lowermost vessel may be insulated from its support, for instance by resting the underside of the lowermost vessel on a heat and electricity insulating pad 25 of asbestos or similar material which is supported by a base 26 of metal or other suitable material. To still further save the heat within the cooker and prevent radiation of the same to the outer atmosphere, the cooker may be inclosed by a hood 27 having its sides and top closed and the opening at its lower end closed by resting its lower edge on the insulating pad 25. By this means a temperature of 350 degrees Fahrenheit, may be maintained within the compartments of the cooker, thus saving a great amount of energy.

To permit of electrically heating the cooker each of its members may be provided with suitable heating wires which are adapted to conduct a current of electricity. As shown in Fig. 1, an electric heating coil or winding 28 of wire is arranged horizontally between the top and bottom of the cover while each of the vessels is provided with a lower horizontal heating coil or winding of wire 29 between the inner and outer bottoms thereof, and a lower vertical heating coil or winding of wire 30 between the inner and outer walls thereof. The coil of the cover is provided at the side wall of the same with suitable terminals 31, 32, for connecting the same with electric supply wires. The lower horizontal wires and upper vertical wires of each vessel are preferably connected in series, as shown in Fig. 5, and the same are provided at the outer wall with three terminals 33, 34, 35, one of which is connected with the corresponding ends of the upper and lower coils while the other two are connected with the opposite extremities of the upper and lower coils so that the same may be connected with the source of electricity in a manner to conduct the current through both the upper and lower coils or through either of the same alone according to the heat desired.

If desired, each of the electric heating coils may be wound or laid between sheets 36 of asbestos which latter in turn are embedded in a slab 37 of material which is high in specific heat, such as concrete, or a mixture of sand and asbestos-cement which slab can take the place of iron or soap stone hot plates. This electrically heated slab may be arranged between the lining and jacket of one of the body members and in contact with the bottom, as shown for instance between the bottoms of the intermediate vessel, in Fig. 1 or the same may be in actual contact with the lining of the body members, as shown in the cover and uppermost vessel of Figs. 1 and 6. In this last mentioned construction the concrete or asbestos and sand composite forms a cement which adheres to the aluminum lining of the cover and vessel and holds the wire coils in place thereon. The composition of the slab must be of high specific heat such as concrete containing a larger proportion of silica or quartz, as is found in 80 percent. quartz sand. Asbestos cement may also be used as the composition for the slab, inasmuch as the same is a good binder and electric insulator and is fireproof.

If desired, the electric wires or coils may be omitted from the slab when the latter is secured to the lining of a body member in which case the same serves the sole purpose of storing the heat which has been imparted to it and gives the same off to the articles to be cooked in a vessel; thereby taking the place of ordinary hot plates of iron or soap stone but leaving more room within the cooker for victuals to be cooked. When the slabs of the cooker sections are unprovided with electric wires the same may be heated by placing the same over a fire or flame, so that the heat strikes the aluminum lining which conducts the same quickly to the slab and the latter in turn absorbs the same rapidly owing to its having the form of a thin layer. The asbestos-sand-cement or concrete composite material thus heated weighs only about half as much as the iron hot plates, on account of the high specific heat, .19 of the quartz sand being nearly double that of iron which is only about .11 at the same time the specific heat of aluminum used for the lining is more than double or .23, water being 1.00. It will thus be seen that the aluminum lining absorbs twice as much heat, and saves more than double its weight over iron hot plate storage, in addition to that of the composite material on said aluminum lining.

Between the composite hot plate slab and the outer wall regranulated cork is used as a heat insulator, this being preferred to mineral wool or asbestos, reducing the weight one half for the insulation over the latter, thus allowing a greater heat storage weight, in the composite material without increasing the weight of the device. The result of this construction does away with outer hot plates in whole or in part, with little or no greater weight than the other construction using heavier insulation material.

In case no heat storage is desired when electrically heated, the wiring is applied to the wall and bottom of the aluminum lining with an asbestos sheet interposed between the wires and the lining and with or without cement of silicate of soda or asbestos cement for attaching same firmly to the aluminum lining.

If very high temperatures are used in heating, the conductors are liable to burn the regranulated cork and to prevent this a layer of mineral wool, sheet asbestos or cellular asbestos may be interposed between the wires and the cork insulation which is packed in the wall, the latter being next to the outer wall.

If desired, the electric heater may be so organized that it is controlled thermostatically and also serves as a condenser. As shown in Fig. 4, and between the bottom of the lowermost vessel or cooker section in Fig. 1, this combined thermostatic electric heater and condenser comprises a lower horizontal disk 38 of zinc which serves as a base provided at its periphery with an edge 39, an upper horizontal disk 40 of galvanized iron having a depending flange 41 which is connected with the edge 39 of the base, a condenser 42 constructed of a tin plate of one polarity and arranged between the top and bottom plates 40, 38, forming the other pole, an electric heating unit 290 having preferably the form of a wire coil or winding and arranged between the bottom plate 38 and the condenser plate 42, and an insulation 44 arranged between said condenser plate and the top and bottom plates. A thermostatic adjusting screw 45 is mounted vertically in a screw nut or disk 46 on the center of the bottom zinc plate and its upper end is provided with a platinum point which is adapted to engage with a platinum contact 47 secured centrally to the center condenser plate. The heating coil has one of its ends connected with the condenser plate and the other end with an insulated binding post or connection 20 on the bottom plate. The screw 45 forms one terminal of the electric circuit of this thermostatic heat controller and condenser and the platinum contact 47 the other terminal.

As the electric heat is produced by the passage of the electric current through the coil 290 the zinc lower plate and the galvanized iron upper plate both expand but the zinc plate expands faster than the galvanized iron plate causing the zinc plate to bulge downwardly at the center. When the heat has reached a predetermined degree at which the screw 45 has been set the bulging of the zinc plate causes the terminal screw to be disengaged from the contact 47, thereby breaking the electric circuit through the coil 290 and causing the temperature to fall. When the zinc plate owing to the reduced temperature has contracted sufficiently to bring the contact screw 45 in engagement with the terminal 47 the electric circuit is again restored and heat is resumed until the temperature rises above the normal or the degree at which the thermostatic switch has been set when the circuit will be again automatically broken. In this manner the heat is always maintained at practically uniform temperature.

For the purpose of rendering the screw 45 accessible when it is desired to adjust the same the outer bottom of the vessel containing this thermostatic controlling device is provided with an opening 48 through which said screw may be reached either by hand or by means of a tool for turning the same.

The action of the condenser is to reduce to a minimum or eliminate entirely the sparking at the platinum contacts of the thermostat adjusting screw point contact and the platinum rivet or disk contact. The center tin plate acts as one of the poles of the condenser, say the positive pole, and the inclosing zinc and galvanized iron plates fastened together at the periphery thereof form the other or negative pole. When the contact is broken at the adjusting screw platinum point the spark is eliminated or reduced to a minimum by the electricity charging these positive and negative plates, in the same manner as in the tin foil condenser of an induction coil and for the same purpose, viz: to reduce the spark.

If it is desired to seal the openings in the vessels more thoroughly than can be done by the usual mechanical fastenings, a thermostatic sealing device is provided which permits of still further saving the heat within the cooking chambers. The thermostatic sealing device preferably comprises a supplemental plug or cover 49 which is constructed of aluminum, zinc, or other high expanding metal alloy which may have a downwardly-tapering edge which fits a correspondingly shaped seat on a ring 50 secured in the upper end of the opening of a vessel, as shown in the uppermost vessel of the sectional cooker illustrated in Figs. 1 and 6. The ring 50 may be constructed of iron or similar metal and the joint between the same and the plug is preferably ground. Upon heating the plug the same expands faster than its seat ring, thereby forming a tight joint between the same and effectually confining the heat within the chamber. The heating of the sealing plug may be effected by the electric heating coils above or by means of a hot plate 51 of iron or soap stone which may be removably inserted in a pocket 52 in the upper side of the sealing plug, as shown in Fig. 1.

To permit of removing the plug it is only necessary to first cool the same either by cutting off the electric current or pouring cold water into the pocket of the plug which causes the same to contract and loosen the joint between the same and the seat ring. Substantially the same effect is produced by the heating of the outer bottom of each upper vessel which engages with the top of the next lower vessel for closing the latter, inasmuch as the bottom when heated electrically, or otherwise, expands and forms a tight joint with its seat on the next lower vessel.

If it is desired to heat the vessel with alcohol lamp when on a picnic where electricity or other heating means are not available, this may be conveniently done by placing the articles to be cooked in the uppermost vessel and supporting a lamp 53 under this vessel by means of a rack 54 which is arranged between the bottom of the uppermost vessel and the top of the next lower vessel, as shown in Fig. 1.

In case the food to be cooked requires an unusual amount of heat the pot 19 holding the food within the cooking chamber has its cover 55 dished downwardly to form a recess 56 in the same which receives a hot plate 57, as shown in Fig. 1. This form of cover and pot also permits of effectually sealing this pot.

In Fig. 2 is shown a cooker which contains but one double wall vessel 57 and a cover 58, the space between the walls of the vessel containing an insulating filler or packing and a thermostatic electric heater and condenser 17 and the space between the walls of the cover also containing an insulating packing and an electric heater 16 similar to that shown in Fig. 1.

The sealing plug 59 in the construction shown in Fig. 2 engages directly with the ring 60 which connects the outer and inner vertical walls of this vessel and this plug is suspended by an annular flange 61 on the periphery thereof resting on the top ring 60 of the vessel.

The form of cooker shown in Fig. 3 is particularly suited as an electric baking oven for bread or a roaster for fowl, and comprises a horizontal vessel 18 supported on a base or bench 62 and having a removable cover 63 and an internal rack 64 for supporting the bake pans 65 or other utensils in a horizontal position, the electric heating means being substantially like those shown in Fig. 1.

In the enameled ware electric roaster shown in Fig. 8, the inner and outer walls 66 and 67 of the vessel are stamped from a single sheet of metal and the silicate or enamel glazing on the same is continuous on its inner and outer sides and the electric heating wires 68 are secured to the underside of the inner wall or lining over asbestos cemented with silicate of soda. The lower edge of the outer wall of the vessel is preferably secured to a base 69, a cover 70 is employed for closing the top of the vessel, and a hood 71 is placed over the vessel and cover and supported on the base for conserving the heat.

I claim as my invention:

1. An electric cooker, having a body composed of a plurality of members each of which is provided with a jacket, a lining, an insulation between the marginal parts of said jacket and lining and an insulating support for said body.

2. An electric cooker comprising a metal cooking chamber, an insulating pad for supporting said chamber, and a hood inclosing said chamber.

3. An electric cooker comprising a metal cooking chamber, an insulating pad for supporting said chamber, a base which carries said pad, and a hood inclosing said chamber and resting at the edge of its lower opening on said pad.

4. An electric cooker comprising a double walled chamber, and a thermostatically controlled electric heater arranged between the walls of said chamber and comprising two connected plates of differentially expansible material, an electric heating coil arranged between said plates and having one end connected with the source of current supply, a fixed terminal connected with the other end of said coil, and a movable electric terminal coöperating with the fixed terminal and mounted on one of said expansible plates.

5. An electric cooker comprising a double walled chamber and a thermostatically controlled electric heater arranged between the walls of said chamber and comprising two connected plates of differentially expansible material, an electric heating coil arranged between said plates and having one end connected with the source of current supply, a fixed terminal connected with the other end of said coil, a movable electric terminal coöperating with the fixed terminal and mounted on one of said expansible plates, and a condenser plate arranged between said expansible plates and carrying said fixed contact or terminal.

Witness my hand this 7th day of October, 1911.

FRANK C. PERKINS.

Witnesses:
E. M. GRAHAM,
ANNA HEIGIS.